May 31, 1960     D. W. ROSENBERG     2,938,324
ROTARY TRASH RAKE

Filed July 3, 1958     2 Sheets-Sheet 1

INVENTOR.
DEWEY W. ROSENBERG

May 31, 1960     D. W. ROSENBERG     2,938,324
ROTARY TRASH RAKE
Filed July 3, 1958     2 Sheets-Sheet 2
FIG. 3
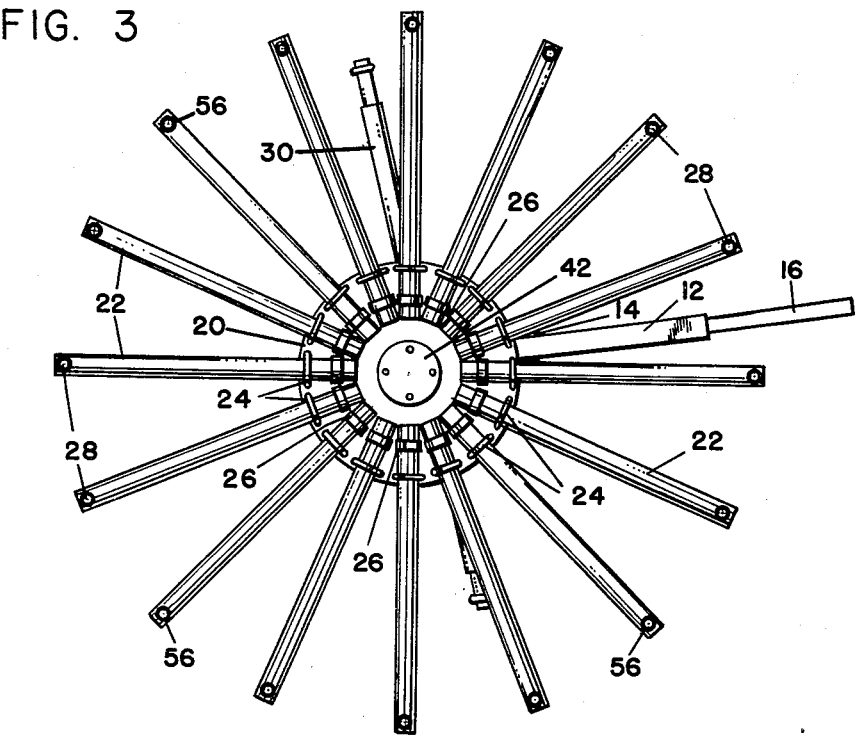
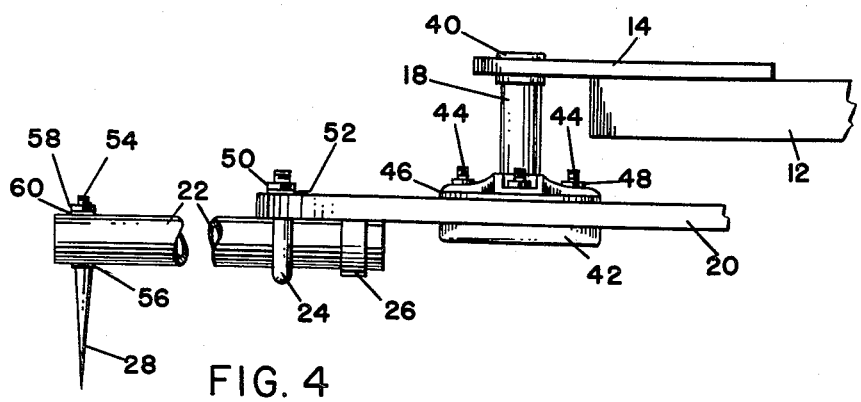
FIG. 4
INVENTOR.
DEWEY W. ROSENBERG.

United States Patent Office
2,938,324
Patented May 31, 1960

2,938,324

ROTARY TRASH RAKE

Dewey W. Rosenberg, Welcome, Minn.

Filed July 3, 1958, Ser. No. 746,409

1 Claim. (Cl. 56—27)

This invention relates to rakes carried by tractors and designed to travel in a horizontal or slightly inclined plane with the parts actuated by engagement of the low side with the ground, and in particular a rake suspended from a tractor or mounted in combination with a tractor drawn plow including a plurality of radially disposed arms extended from a hub plate rotatably mounted on the end of a bar mounted in an inclined position on a tractor with depending teeth or prongs secured in inclined positions in extended ends of the arms whereby with the arms in a plane inclined slightly in relation to the ground the prongs on the low side engage the ground rotating the rake so that corn stalks and other trash are raked into a furrow.

The purpose of this invention is to provide a rotary rake for cleaning corn stalks, rubble, and other trash from fields being plowed in which the construction of the rake is such that heavy stalks, such as stalks of hybrid corn, may be efficiently raked from a field without damaging the rake structure.

Various types of rakes having tines extended from large rings and other types of prongs mounted by different means have been provided and although such rakes are suitable for straw and other debris, the tines are not sufficiently rigid to remove the stalks of hybrid corn, roots of brush, and the like.

With this thought in mind this invention contemplates a hub plate rotatably mounted on the extended end of a bar secured to the frame of a tractor and having radially disposed arms with prongs depending from extended ends adjustably mounted thereon whereby with the hub plate mounted in a horizontal or slightly inclined position the prongs on one side contact the ground and cause the rake to rotate.

The object of this invention is, therefore, to provide a rake of the type that rotates in a slightly inclined plane in which arms extended from a hub plate and having prongs depending from the extended ends are of sufficient strength to rake stubble such as hybrid corn stalks.

Another object of the invention is to provide a horizontally rotatable rake that is of rigid construction and that is readily mounted on a tractor, or the like.

Another important object of the invention is to provide a substantially horizontally rotatable rake having rigid prongs depending from radially disposed arms in which the rake is suitable for use on three and four bottom plows.

A further object of the invention is to provide a rake of the type that rotates in a substantially horizontal plane and that is formed with prongs in extended ends of radially disposed arms in which the inclination of the rake is readily adjustable.

A still further object of the invention is to provide a rake that rotates in a slightly inclined plane and that is designed to be mounted on a tractor or plow in which the rake may be installed without changing parts of the tractor or plow.

And a still further object is to provide a rake mounted to rotate in an inclined plane and having prongs depending from extended ends of radially disposed arms in which the rake is of simple and economical construction.

With these and other objects and advantages in view the invention embodies a beam, means for suspending the beam from the frame of a tractor, a draw-bar extended from one end of the beam, a shaft rotatably mounted in the draw-bar and depending therefrom, a hub plate or disc carried by the lower end of the shaft, radially disposed arms mounted on and extended from the hub plate, and prongs mounted in extended ends of the arms.

Other features and advantages of the invention will appear from the following description taken in connection with the drawings, wherein:

Figure 3 is a view looking upwardly toward the under surface of the rake, with the parts shown on an enlarged scale.

Figure 4 is an elevational view with the parts shown on a further enlarged scale and with parts broken away illustrating the construction of the rake.

Figure 1:
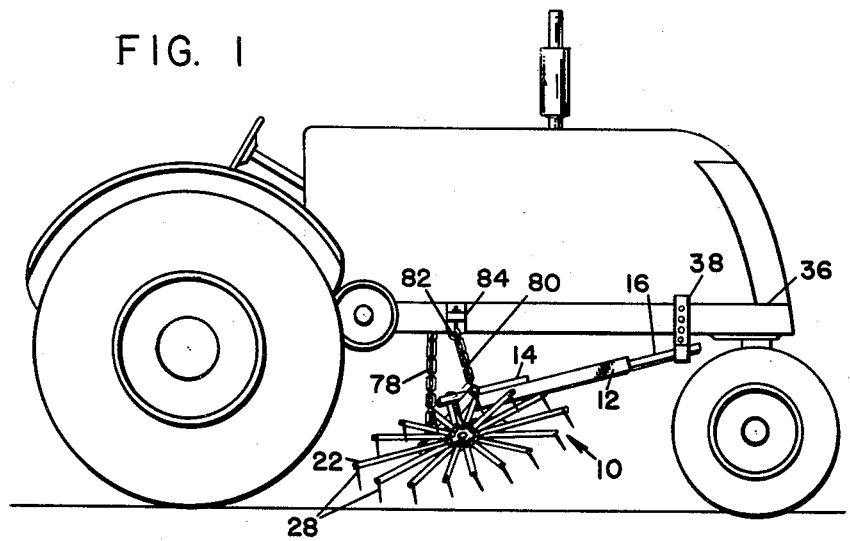
Figure 1 is a side elevational view showing the rotary trash rake mounted on a tractor.
Figure 2:
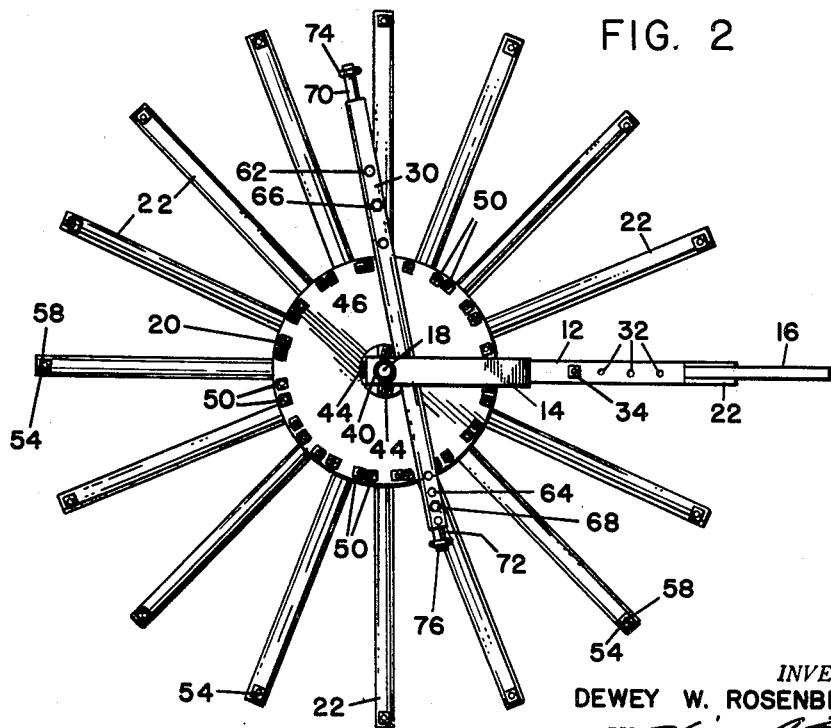
Figure 2 is a plan view of the rake with the mounting elements thereof shown above the rake assembly.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a mounting beam having a draw-bar 14 extended from one end and a telescoping bar 16 adjustably mounted in the opposite end, numeral 18 indicating a shaft rotatably mounted in the extended end of the draw-bar, numeral 20 indicating a hub plate secured to the lower end of the shaft, numeral 22 indicating tubular arms secured to the hub plate by U-bolts 24 and brackets or sockets 26 and extended radially therefrom, numeral 28 indicating prongs or teeth mounted in extended ends of the arms and depending therefrom, and numeral 30 indicating a cross arm positioned below the draw-bar and connected by chains to a tractor frame.

The beam 12 is provided with spaced openings 32 through which a bolt 34 extends for securing the telescoping bar 16 in adjusted positions, and the extended end of the bar 16 is attached to a tractor frame 36 by a clamp 38, as shown in Figure 1. The shaft 18 is rotatably mounted in the draw-bar by a bearing 40 and the lower end of the shaft is provided with a head 42 against which the hub plate 20 is clamped by bolts 44 which extend from the head through a disc 46, the bolts being provided with nuts 48. The arms 22 are adjustably clamped against the under surface of the hub plate by the U-bolts, on the ends of which are nuts 50 and washers 52, and the prongs or teeth 28 are provided with studs 54 which extend from shoulders 56 and on which nuts 58 are threaded. Washers 60 are positioned between the nuts and arms.

The cross arm 30 is tubular and the ends are provided with spaced openings 62 and 64 through which bolts 66 and 68 extend. The bolts 66 and 68 also extend through studs 70 and 72 on the ends of which hooks 74 and 76 are provided, and the hooks are positioned to receive lower links of chains 78 and 80, the upper ends of which are secured to the tractor frame by hooks 82 on brackets 84 that are clamped on the tractor frame.

The cross arm 30 extends through the attachment below the draw-bar 14 and mounting beam 12, with the ends supported by chains from a tractor. By this means the draw-bar and beam are free to slide on the cross arm to facilitate adjusting the teeth of the rake.

Operation

With the telescoping bar in the mounting beam the position of the rake on a tractor is readily adjustable, and by placing the hooks in different links of the chains the angle of inclination of the arms and teeth or prongs is also adjusted to obtain efficient cleaning of a field, and with the rake positioned on a tractor or mounted on a plow the stubble or other trash may be pushed or raked into a furrow or the like. The nuts of the U-bolts are loosened to adjust the angle of the prongs in relation to the ground. By this means the rake is rotated by engagement of the prongs with the ground, and with the rake operated in this manner it is not necessary to elevate the rake in turning at the end of a field, or when operating the rake in reverse.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent is:

In a rotary trash rake, the combination which comprises a mounting beam, a draw-bar extended from one end of the mounting beam, a telescoping bar positioned in the end of the mounting beam opposite to the end on which the draw-bar is positioned, a clamp on the extended end of the telescoping bar for attaching the telescoping bar to a tractor, a vertically disposed shaft mounted on and depending from the draw-bar, a hub plate carried by the lower end of the shaft, sockets depending from the under surface of the hub, radially disposed tubular arms mounted in the sockets and extended from the hub, U-bolts positioned over the tubular arms and extended through the hub for retaining the tubular arms in position on the hub, prongs depending from outer ends of the tubular arms, a transversely disposed cross arm operatively associated with and positioned below the draw-bar, and chains operatively associated with the outer ends of the cross arm for supporting the attachment from a tractor.

References Cited in the file of this patent

UNITED STATES PATENTS

| | | |
|---|---|---|
| 2,577,264 | Oppegaard | Dec. 4, 1951 |
| 2,588,599 | Winter | Mar. 11, 1952 |
| 2,710,519 | Winter | June 14, 1955 |